United States Patent [19]
Le-Khac

[11] Patent Number: 5,545,601
[45] Date of Patent: Aug. 13, 1996

[54] POLYETHER-CONTAINING DOUBLE METAL CYANIDE CATALYSTS

[75] Inventor: Bi Le-Khac, West Chester, Pa.

[73] Assignee: Arco Chemical Technology, L.P., Greenville, Del.

[21] Appl. No.: 517,780

[22] Filed: Aug. 22, 1995

[51] Int. Cl.$^6$ ..................................................... B01J 31/00
[52] U.S. Cl. ........................... 502/156; 502/154; 502/159
[58] Field of Search ................................... 502/154, 156, 502/159

[56] References Cited

U.S. PATENT DOCUMENTS

| | | |
|---|---|---|
| 3,278,457 | 10/1966 | Milgrom . |
| 3,278,458 | 10/1966 | Belner . |
| 3,404,109 | 10/1968 | Milgrom . |
| 3,427,256 | 2/1969 | Milgrom . |
| 3,538,043 | 11/1970 | Herold . |
| 3,829,505 | 8/1974 | Herold . |
| 3,900,518 | 8/1975 | Milgrom . |
| 3,941,849 | 3/1976 | Herold . |
| 4,472,560 | 9/1984 | Kuyper et al. ............................ 526/120 |
| 5,145,883 | 9/1992 | Saito et al. ................................ 521/172 |
| 5,158,922 | 10/1992 | Hinney et al. ............................ 502/175 |
| 5,223,583 | 6/1993 | Higuchi et al. ........................... 525/404 |
| 5,482,908 | 1/1996 | Le-Khac .................................... 502/156 |

OTHER PUBLICATIONS

J. L. Schuchardt et al., Preparation of High Molecular Weight Polyols Using Double Metal Cyanide Catalylsts, "Proceedings of the SPI, 32nd Annual Polyurethane Technical/Marketing Conference", Oct. 1989, p. 360.

Primary Examiner—Asok Pal
Assistant Examiner—E. D. Irzinski
Attorney, Agent, or Firm—Jonathan L. Schuchardt

[57] ABSTRACT

Improved double metal cyanide (DMC) catalysts are disclosed. The catalysts comprise a DMC compound, an organic complexing agent, and from about 5 to about 80 wt. % of a polyether polyol that has tertiary hydroxyl groups. Compared with other DMC catalysts, those of the invention have excellent activity for epoxide polymerization, and they can be used to make polyols having very low unsaturation even at high epoxide polymerization temperatures.

14 Claims, 1 Drawing Sheet

POLYETHER-CONTAINING DOUBLE METAL CYANIDE CATALYSTS

FIELD OF THE INVENTION

The invention relates to double metal cyanide (DMC) catalysts useful for epoxide polymerization. In particular, the invention relates to DMC catalysts that have high activity and that give very low unsaturation polyols even at relatively high epoxide polymerization temperatures.

BACKGROUND OF THE INVENTION

Double metal cyanide complexes are well-known catalysts for epoxide polymerization. These active catalysts give polyether polyols that have low unsaturation compared with similar polyols made using basic (KOH) catalysis. The catalysts can be used to make many polymer products, including polyether, polyester, and polyetherester polyols. The polyols can be used in polyurethane coatings, elastomers, sealants, foams, and adhesives.

DMC catalysts are usually made by reacting aqueous solutions of metal salts and metal cyanide salts to form a precipitate of the DMC compound. A low molecular weight complexing agent, typically an ether or an alcohol is included in the catalyst preparation. The complexing agent is needed for favorable catalyst activity. Preparation of typical DMC catalysts is described, for example, in U.S. Pat. Nos. 3,427,256, 3,829,505, and 5,158,922.

We recently described highly active DMC catalysts that include, in addition to a low molecular weight organic complexing agent, from about 5 to about 80 wt. % of a polyether having a molecular weight greater than about 500 (see U.S. Pat. No. 5,482,908). Excellent results are obtained when the polyether component of the DMC catalyst is a polyoxypropylene polyol. Compared with earlier DMC catalysts, the polyether-containing DMC catalysts have excellent activity and give polyether polyols with very low unsaturation. In addition, polyether-containing DMC catalysts such as those described in U.S. Pat. No. 5,482,908 are easier to remove from the polyol products following epoxide polymerization.

The polyether-containing DMC catalysts that we described earlier are valuable because they give polyether polyols with low unsaturation, and they are active enough to allow their use at very low concentrations, often low enough to overcome any need to remove the catalyst from the polyol. Catalysts with even higher activity are desirable because reduced catalyst levels could be used.

One drawback of polyether-containing DMC catalysts now known (and DMC catalysts generally) is that polyol unsaturations increase with epoxide polymerization temperature. Thus, polyols prepared at higher reaction temperatures (usually to achieve higher reaction rates) tend to have increased unsaturation levels. This sensitivity of unsaturation to increases in epoxide polymerization temperature is preferably minimized or eliminated.

An ideal catalyst would give polyether polyols with low unsaturation and would be active enough to use at very low concentrations, preferably at concentrations low enough to overcome any need to remove the catalyst from the polyol. Particularly valuable would be a catalyst that can produce polyether polyols having very low unsaturation levels over a broad range of epoxide polymerization temperatures.

SUMMARY OF THE INVENTION

The invention is a solid double metal cyanide (DMC) catalyst useful for epoxide polymerizations. The catalyst comprises a DMC compound, an organic complexing agent, and from about 5 to about 80 wt. % of a polyether polyol. Some or all of the hydroxyl groups of the polyether polyol are tertiary hydroxyl groups. The invention also includes a method for making the catalysts, and a process for making epoxide polymers using the catalysts.

I surprisingly found that DMC catalysts that include a tertiary hydroxyl group-containing polyol have excellent activity. In addition, the catalysts of the invention can be used to make polyols having very low unsaturations even at relatively high epoxide polymerization temperatures. The reduced sensitivity of unsaturation to reaction temperature allows for efficient production of polyether polyols while maintaining high product quality.

DETAILED DESCRIPTION OF THE INVENTION

Figure 1:
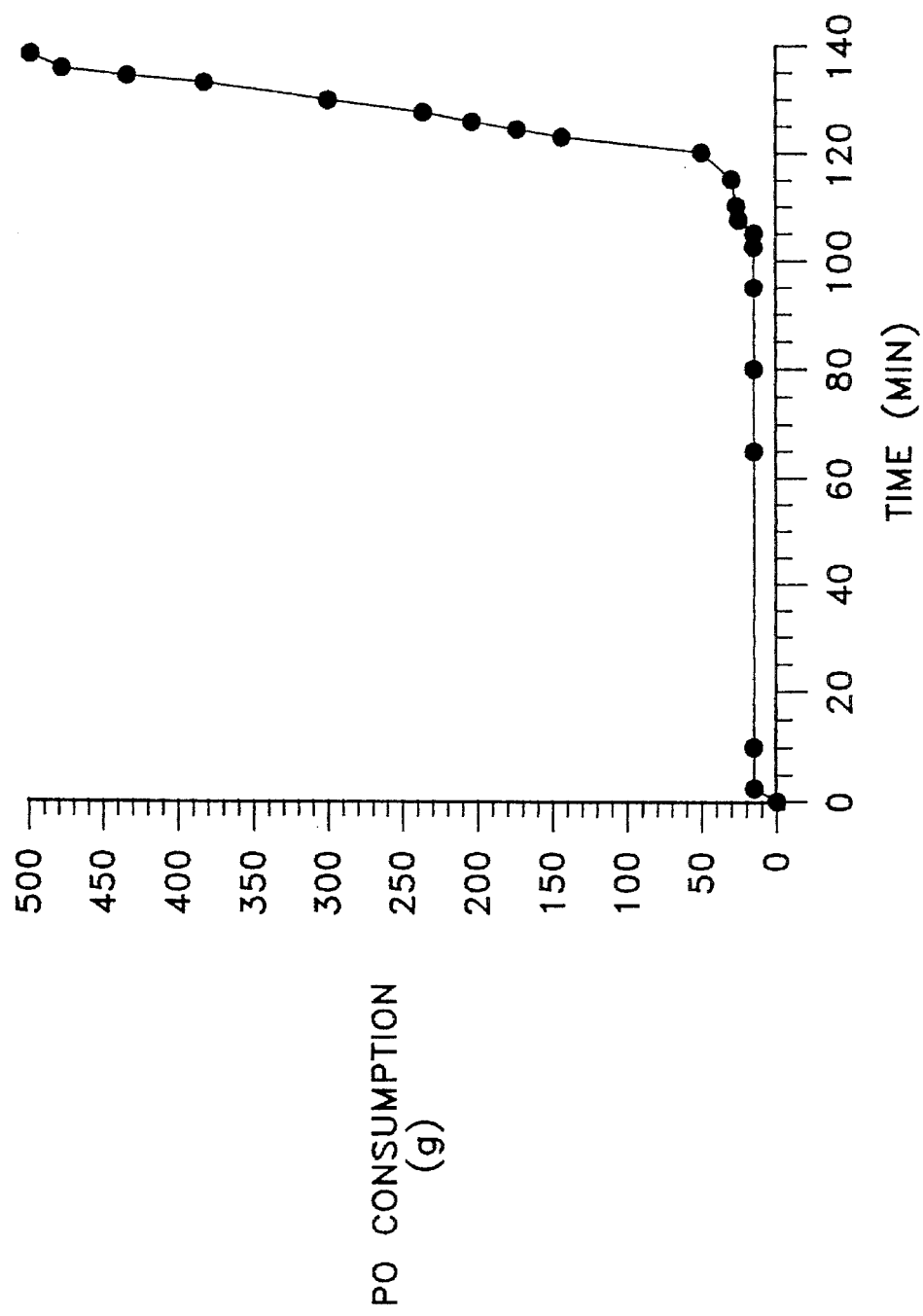
FIG. 1 shows a plot of propylene oxide consumption versus time during a polymerization reaction with one of the catalyst compositions of the invention (see Example 6) at 100 ppm catalyst and 105° C.

Double metal cyanide compounds useful in the invention are the reaction products of a water-soluble metal salt and a water-soluble metal cyanide salt. The water-soluble metal salt preferably has the general formula $M(X)_n$ in which M is selected from the group consisting of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II), and Cr(III). More preferably, M is selected from the group consisting of Zn(II), Fe(II), Co(II), and Ni(II). In the formula, X is preferably an anion selected from the group consisting of halide, hydroxide, sulfate, carbonate, cyanide, oxalate, thiocyanate, isocyanate, isothiocyanate, carboxylate, and nitrate. The value of n is from 1 to 3 and satisfies the valency state of M. Examples of suitable metal salts include, but are not limited to, zinc chloride, zinc bromide, zinc acetate, zinc acetonylacetate, zinc benzoate, zinc nitrate, iron(II) sulfate, iron(II) bromide, cobalt(II) chloride, cobalt(II) thiocyanate, nickel(II) formate, nickel(II) nitrate, and the like, and mixtures thereof.

The water-soluble metal cyanide salts used to make the double metal cyanide compounds useful in the invention preferably have the general formula $(Y)_a M'(CN)_b (A)_c$ in which M' is selected from the group consisting of Fe(II), Fe(III), Co(II), Co(III), Cr(II), Cr(III), Mn(II), Mn(III), Ir(III), Ni(II), Rh(III), Ru(II) V(IV), and V(V). More preferably, M' is selected from the group consisting of Co(II), Co(III), Fe(II), Fe(III), Cr(III), Ir(III), and Ni(II). The water-soluble metal cyanide salt can contain one or more of these metals. In the formula, Y is an alkali metal ion or alkaline earth metal ion. A is an anion selected from the group consisting of halide, hydroxide, sulfate, carbonate, cyanide, oxalate, thiocyanate, isocyanate, isothiocyanate, carboxylate, and nitrate. Both a and b are integers greater than or equal to 1; the sum of the charges of a, b, and c balances the charge of M'. Suitable water-soluble metal cyanide salts include, but are not limited to, potassium hexacyanocobaltate(III), potassium hexacyanoferrate(II), potassium hexacyanoferrate(III), calcium hexacyanocobaltate(III), lithium hexacyanoiridate(III), and the like.

Examples of double metal cyanide compounds that can be used in the invention include, for example, zinc hexacyanocobaltate(III), zinc hexacyanoferrate(III), zinc hexacyanoferrate(II), nickel(II) hexacyanoferrate(II), cobalt(II) hexacyanocobaltate(III), and the like. Further examples of suitable double metal cyanide compounds are listed in U.S. Pat. No. 5,158,922, the teachings of which are incorporated herein by reference.

The solid DMC catalysts of the invention include an organic complexing agent. Generally, the complexing agent must be relatively soluble in water. Suitable complexing agents are those commonly known in the art, as taught, for example, in U.S. Pat. No. 5,158,922. The complexing agent is added either during preparation or immediately following precipitation of the catalyst. Usually, an excess amount of the complexing agent is used. Preferred complexing agents are water-soluble heteroatom-containing organic compounds that can complex with the double metal cyanide compound. Suitable complexing agents include, but are not limited to, alcohols, aldehydes, ketones, ethers, esters, amides, ureas, nitriles, sulfides, and mixtures thereof. Preferred complexing agents are water-soluble aliphatic alcohols selected from the group consisting of ethanol, isopropyl alcohol, n-butyl alcohol, isobutyl alcohol, sec-butyl alcohol, and tert-butyl alcohol. Tert-butyl alcohol is most preferred.

The solid DMC catalysts of the invention include from about 5 to about 80 wt. % of a polyether polyol. Some or all of the hydroxyl groups of the polyether polyol are tertiary hydroxyl groups. Preferred catalysts include from about 10 to about 70 wt. % of the polyether polyol; most preferred catalysts include from about 15 to about 60 wt. % of the polyether polyol. At least about 5 wt. % of the polyether polyol is needed to significantly improve the catalyst activity compared with a catalyst made in the absence of the polyether polyol. Catalysts that contain more than about 80 wt. % of the polyether polyol are generally no more active, and they are impractical to isolate and use because they are typically sticky pastes rather than powdery solids.

Polyether polyols suitable for use in making the catalysts of the invention have at least some tertiary hydroxyl groups. Preferred polyether polyols have at least about 5% tertiary hydroxyl groups; more preferred are polyols that have at least about 20% tertiary hydroxyl groups.

The polyols used in the catalysts can be made by any suitable method. Polyether polyols made by ring-opening polymerization of cyclic ethers (epoxides, oxetanes, tetrahydrofurans) can be used. The polyols can be made by any method of catalysis (acid, base, coordination catalyst). Tertiary hydroxyl groups are conveniently introduced by including a cyclic ether monomer that is fully substituted at the α-carbon atom of the cyclic ether. Cyclic ethers useful for introducing tertiary hydroxyl groups include, for example, isobutylene oxide, 1,1,2-trimethylethylene oxide, 1,1,2,2,-tetramethylethylene oxide, 2,2-dimethyloxetane, diisobutylene oxide, α-methylstyrene oxide, and the like. For example, one polyether polyol suitable for use in making the catalysts of the invention is prepared by making a polyoxypropylene polyol using double metal cyanide catalysis, and then adding isobutylene oxide to cap the polyol and convert some or most of the hydroxyl groups from primary or secondary to tertiary hydroxyl groups.

Suitable polyether polyols include those in which tertiary hydroxyl group content is introduced by including a lactone monomer in which the carbon α- to the lactone oxygen is fully substituted. Thus, for example, a suitable polyol for use in the invention is made by reacting a polyoxypropylene polyol with ε, ε-dimethyl-ε-caprolactone to cap the polyol and give a product in which at least some of the hydroxyl groups are tertiary hydroxyl groups.

Preferred polyether polyols for making the catalysts have average hydroxyl functionalities from about 2 to 8, and number average molecular weights within the range of about 200 to about 10,000 (more preferably from about 500 to about 5000). Most preferred are polyether diols and triols having number average molecular weights from about 1000 to about 4000.

Particularly preferred polyether polyols are polyoxypropylene diols and triols capped with from about 1 to 5 isobutylene oxide units. These polyols preferably have at least about 20% of tertiary hydroxyl groups.

Both an organic complexing agent and a polyether polyol are needed in the double metal cyanide catalyst. Including the polyether polyol in addition to the organic complexing agent enhances activity of the catalyst compared with the activity of a similar catalyst prepared in the absence of the polyether polyol. The organic complexing agent is also needed: a catalyst made in the presence of the polyether polyol, but without an organic complexing agent such as tert-butyl alcohol, will not polymerize epoxides.

I surprisingly found that the use of a polyether polyol having tertiary hydroxyl groups further improves the catalyst compared with catalysts made with an organic complexing agent and a polyether polyol that does not have tertiary hydroxyl groups. The catalysts of the invention have high activity for polymerizing epoxides, and they can be used to make polyols having very low unsaturations even at relatively high epoxide polymerization temperatures.

As the results in Table 1 (below) show, the catalysts of the invention have excellent activity for polymerizing epoxides—as good as or better than catalysts made with polyols that have no tertiary hydroxyl groups. In addition, the catalysts of the invention give polyol products having low unsaturation even at relatively high epoxide polymerization temperatures. Compare Examples 1 and 2 with Comparative Examples 9 and 10. These examples show that raising epoxide polymerization temperature to 150° C. has a reduced impact on polyol unsaturation when a catalyst of the invention is used.

The invention includes a method for making the catalysts. The method comprises preparing a solid DMC catalyst in the presence of an organic complexing agent and a polyether polyol that contains tertiary hydroxyl groups. Aqueous solutions of a metal salt (excess) and a metal cyanide salt are reacted in the presence of the organic complexing agent and the polyether polyol. The polyether polyol is used in an amount sufficient to produce a solid DMC catalyst that contains from about 5 to about 80 wt. % of the polyether polyol.

In a typical method, aqueous solutions of a metal salt (such as zinc chloride) and a metal cyanide salt (such as potassium hexacyanocobaltate) are first reacted in the presence of an organic complexing agent (such as tert-butyl alcohol) using efficient mixing to produce a catalyst slurry. The metal salt is used in excess. The catalyst slurry contains the reaction product of the metal salt and metal cyanide salt, which is the double metal cyanide compound. Also present are excess metal salt, water, and organic complexing agent; each is incorporated to some extent in the catalyst structure.

The organic complexing agent can be included with either or both of the the aqueous salt solutions, or it can be added to the catalyst slurry immediately following precipitation of the DMC compound. It is generally preferred to premix the complexing agent with either aqueous solution, or both, before combining the reactants. If the complexing agent is added to the catalyst precipitate instead, then the reaction mixture should be mixed efficiently with a homogenizer or a high-shear stirrer to produce the most active form of the catalyst.

The catalyst slurry produced as described above is combined with the polyether polyol having tertiary hydroxyl groups. This is preferably done using low-shear mixing to avoid thickening or coagulation of the reaction mixture. The polyether-containing catalyst is then usually isolated from the catalyst slurry by any convenient means, such as filtration, centrifugation, decanting, or the like.

The isolated polyether-containing solid catalyst is preferably washed with an aqueous solution that contains additional organic complexing agent. Washing is generally accomplished by reslurrying the catalyst in the aqueous solution of organic complexing agent, followed by a catalyst isolation step. The washing step removes impurities that can render the catalyst inactive if they are not removed. Preferably, the amount of organic complexing agent used in this aqueous solution is within the range of about 40 wt. % to about 70 wt. %. It is also preferred to include some polyether polyol in the aqueous solution of organic complexing agent. The amount of polyether polyol in the wash solution is preferably within the range of about 0.5 to about 8 wt. %.

While a single washing step suffices, it it generally preferred to wash the catalyst more than once. The subsequent wash can be a repeat of the first wash. Preferably, the subsequent wash is non-aqueous, i.e., it includes only the organic complexing agent or a mixture of the organic complexing agent and polyether polyol. After the catalyst has been washed, it is usually preferred to dry it under vacuum until the catalyst reaches a constant weight.

The invention includes a process for making an epoxide polymer. This process comprises polymerizing an epoxide in the presence of a double metal cyanide catalyst of the invention. Preferred epoxides are ethylene oxide, propylene oxide, butene oxides, styrene oxide, and the like, and mixtures thereof. The process can be used to make random or block copolymers. The epoxide polymer can be, for example, a polyether polyol derived from the polymerization of an epoxide in the presence of a hydroxyl group-containing initiator.

Other monomers that will copolymerize with an epoxide in the presence of a DMC compound can be included in the process of the invention to make other types of epoxide polymers. Any of the copolymers known in the art made using conventional DMC catalysts can be made with the catalysts of the invention. For example, epoxides copolymerize with oxetanes (as taught in U.S. Pat. Nos. 3,278,457 and 3,404,109) to give polyethers or with anhydrides (as taught in U.S. Pat. Nos. 5,145,883 and 3,538,043) to give polyester or polyetherester polyols. The preparation of polyether, polyester, and polyetherester polyols using double metal cyanide catalysts is fully described, for example, in U.S. Pat. Nos. 5,223,583, 5,145,883, 4,472,560, 3,941,849, 3,900,518, 3,538,043, 3,404,109, 3,278,458, 3,278,457, and in J. L. Schuchardt and S. D. Harper, *SPI Proceedings, 32nd Annual Polyurethane Tech./Market. Conf.* (1989) 360. The teachings of these U.S. patents related to polyol synthesis using DMC catalysts are incorporated herein by reference in their entirety.

Polyether polyols made with the catalysts of the invention preferably have average hydroxyl functionalities from about 2 to 8, more preferably from about 2 to 6, and most preferably from about 2 to 3. The polyols preferably have number average molecular weights within the range of about 500 to about 50,000. A more preferred range is from about 1,000 to about 12,000; most preferred is the range from about 2,000 to about 8,000.

The following examples merely illustrate the invention. Those skilled in the art will recognize many variations that are within the spirit of the invention and scope of the claims.

EXAMPLE A

Preparation of a Solid DMC Catalyst containing tert-Butyl Alcohol and an Isobutylene oxide-capped 4K mol. wt. Polyoxypropylene Diol Potassium hexacyanocobaltate (8.0 g) is dissolved in deionized (DI) water (140 mL) in a beaker (Solution 1). Zinc chloride (25 g) is dissolved in DI water (40 mL) in a second beaker (Solution 2). A third beaker contains Solution 3: a mixture of DI water (200 mL), tert-butyl alcohol (2 mL), and Polyol W (8 g). Polyol W is made by preparing a 4000 mol. wt. polyoxypropylene diol using via double metal cyanide catalysis (Polyol X), and then endcapping it with from 1 to 5 equivalents per hydroxyl group of isobutylene oxide using the same DMC catalyst.

Solutions 1 and 2 are mixed together using a homogenizer. Immediately, a 50/50 (by volume) mixture of tert-butyl alcohol and DI water (200 mL total) is added to the zinc hexacyanocobaltate mixture, and the product is homogenized for 10 min.

Solution 3 (the polyol/water/tert-butyl alcohol mixture) is added to the aqueous slurry of zinc hexacyanocobaltate, and the product is stirred magnetically for 2 min. The mixture is filtered under pressure through a 5-μm filter to isolate the solids.

The solid cake is reslurried in tert-butyl alcohol (140 mL) and DI water (60 mL), and the mixture is homogenized for 10 min. A solution of DI water (200 mL) and additional Polyol W (2 g) is added, and the mixture is stirred magnetically for 2 min. and filtered as described above.

The solid cake is reslurried in tert-butyl alcohol (200 mL) and is homogenized for 10 min. Polyol W (1 g) is added, and the mixture is starred magnetically for 2 min. and filtered. The resulting solid catalyst is dried under vacuum at 50° C. (30 in. Hg) to constant weight. The yield of dry, powdery catalyst is about 10 g.

Elemental, thermogravimetric, and mass spectral analyses of the solid catalyst show: polyol=18.0 wt. %; tert-butyl alcohol=9.0 wt. %; cobalt=9.5 wt. %; zinc=20.1 wt. %.

The catalyst described above is used to make the polyether polyols of Examples 1 and 2 (see Table 1).

A similar procedure is used to make additional catalysts that contain 23 or 50 wt. % of Polyol W, and these catalysts are used for Examples 3–8 (see Table 1 ).

A control catalyst, which is used in Comparative Examples 9 and 10, is made as in Example A, except that Polyol X (a 4000 molecular weight polyoxypropylene diol made by DMC catalysis) is used instead of Polyol W, and the resulting catalyst contains 34 wt. % of Polyol X.

EXAMPLE C

Epoxide Polymerizations: Rate Experiments-General Procedure

A one-liter stirred reactor is charged with polyoxypropylene triol (700 mol. wt.) starter (70 g) and polyol-containing zinc hexacyanocobaltate catalyst (0.057 g, 100 ppm level in finished polyol). The mixture is stirred and heated to 105° C., and is stripped under vacuum to remove traces of water from the triol starter. The reactor pressure is adjusted to a vacuum of about 30 in. (Hg), and propylene oxide (10–11 g)

is added in one portion. The reactor pressure is then monitored carefully. Additional propylene oxide is not added until an accelerated pressure drop occurs in the reactor; the pressure drop is evidence that the catalyst has become activated. When catalyst activation is verified, the remaining propylene oxide (490 g) is added gradually to keep the reactor pressure at about 10 psig. After propylene oxide addition is complete, the mixture is held at 105° C. until a constant pressure is observed. Residual unreacted monomer is then stripped under vacuum from the polyol product, and the polyol is cooled and recovered.

To determine reaction rate, a plot of PO consumption (g) vs. reaction time (min) is prepared (see FIG. 1). The slope of the curve at its steepest point is measured to find the reaction rate in grams of PO converted per minute. The intersection of this line and a horizontal line extended from the baseline of the curve is taken as the induction time (in minutes) required for the catalyst to become active. Measured reaction rates are summarized in Table 1.

When this procedure is used to measure propylene oxide polymerization rates, the catalysts of the invention typically polymerize PO at rates in excess of about 10 g/min at 100 ppm catalyst at 105° C. (see FIG. 1). The epoxide polymerization rates for the catalysts of the invention (which include a polyether polyol having tertiary hydroxyl groups) are also consistently higher than similar catalysts prepared in the presence of polyether polyols without tertiary hydroxyl groups. This procedure is used to prepare the 6000 molecular weight polyether triols (6K-T) shown in Table 1 using a 700 mol. wt. polyoxypropylene triol starter. (See Examples 1, 3, and 6, and Comparative Example 9.)

EXAMPLE D

Polyether Polyol Synthesis: 8000 Mol. Wt. Polyoxypropylene Diol (8K-D)

A one-liter stirred reactor is charged with polyoxypropylene diol (1000 mol. wt.) starter (77 g) and zinc hexacyanocobaltate catalyst (0.015 g, 25 ppm). The mixture is stirred and heated to 105° C., and is stripped under vacuum for 0.5 h to remove traces of water from the diol starter. After stripping, the reaction temperature is raised to 145° C. Propylene oxide (12 g) is fed to the reactor, initially under a vacuum of about 30 in. (Hg), and the reactor pressure is monitored carefully. Additional propylene oxide is not added until an accelerated pressure drop occurs in the reactor; the pressure drop is evidence that the catalyst has become activated. When catalyst activation is verified, the remaining propylene oxide (512 g) is added gradually over about 4 h. After propylene oxide addition is complete, the mixture is held at 145° C. until a constant pressure is observed. Residual unreacted monomer is then stripped under vacuum at 60° C. from the polyol product. (See Examples 2, 4, 5, 7, and 8, and Comparative Example 10.)

The preceding examples are meant only as illustrations. The scope of the invention is defined by the claims.

TABLE 1

Polyether-Containing Double Metal Cyanide Catalysts and Polyols Made Using the Catalysts

| | Polyol in Catalyst | | Epoxide Polymerization Conditions | | | Product Polyol Characteristics | | |
|---|---|---|---|---|---|---|---|---|
| Ex # | Type of Polyol | Amt. (wt. %) | Temp (°C.) | Cat. level (ppm) | Rate (g PO/min) | Polyol made | Unsat. (meq/g) | Mw/Mn |
| 1 | W | 18 | 105 | 100 | 22.7 | 6K-T | 0.0046 | 1.20 |
| 2 | W | 18 | 150 | 25 | — | 8K-D | 0.0074 | 1.16 |
| 3 | W | 50 | 105 | 100 | 21.7 | 6K-T | 0.0047 | 1.19 |
| 4 | W | 50 | 120 | 25 | — | 8K-D | 0.0065 | 1.41 |
| 5 | W | 50 | 130 | 25 | — | 8K-D | 0.0076 | 1.22 |
| 6 | W | 23 | 105 | 100 | 29.4 | 6K-T | 0.0043 | 1.15 |
| 7 | W | 23 | 145 | 25 | — | 8K-D | 0.0068 | 1.07 |
| 8 | W | 23 | 145 | 10 | — | 8K-D | 0.0072 | 1.15 |
| C9 | X | 34 | 105 | 100 | 17.9 | 6K-T | 0.0039 | — |
| C10 | X | 34 | 150 | 25 | — | 8K-D | 0.0114 | 1.45 |

Polyols: W = IBO-capped 4K poly(PO) diol; X = 4K poly(PO) diol. 6K-T = 6000 mol. wt. polyoxypropylene triol; 8K-D = 8000 mol. wt. polyoxypropylene diol.

I claim:

1. A solid double metal cyanide (DMC) catalyst useful for epoxide polymerizations, said catalyst comprising:
   (a) a double metal cyanide compound;
   (b) an organic complexing agent; and
   (c) from about 5 to about 80 wt. % of a polyether polyol;
   wherein some or all of the hydroxyl groups of the polyether polyol are tertiary hydroxyl groups.

2. The catalyst of claim 1 wherein the double metal cyanide compound is a zinc hexacyanocobaltate.

3. The catalyst of claim 1 wherein the organic complexing agent is a water-soluble aliphatic alcohol selected from the group consisting of ethanol, isopropyl alcohol, n-butyl alcohol, isobutyl alcohol, sec-butyl alcohol, and tert-butyl alcohol.

4. The catalyst of claim 3 wherein the organic complexing agent is tert-butyl alcohol.

5. The catalyst of claim 1 wherein the polyether polyol is an isobutylene oxide-capped poly(oxypropylene) polyol having a number average molecular weight within the range of about 200 to about 10,000.

6. A method which comprises preparing a solid double metal cyanide (DMC) catalyst in the presence of an organic complexing agent and a polyether polyol having tertiary hydroxyl groups, wherein the solid DMC catalyst contains from about 5 to about 80 wt. % of the polyether polyol.

7. The method of claim 6 wherein the DMC catalyst is a zinc hexacyanocobaltate.

8. The method of claim 6 wherein the organic complexing agent is a water-soluble aliphatic alcohol selected from the group consisting of ethanol, isopropyl alcohol, n-butyl alcohol, isobutyl alcohol, sec-butyl alcohol, and tert-butyl alcohol.

9. The method of claim 6 wherein the organic complexing agent is tert-butyl alcohol.

10. The method of claim 6 wherein the polyether polyol is an isobutylene oxide-capped poly(oxypropylene) polyol having a number average molecular weight within the range of about 200 to about 10,000.

11. A method of preparing a solid double metal cyanide (DMC) catalyst useful for epoxide polymerization, said method comprising:

(a) reacting aqueous solutions of a metal salt (excess) and a metal cyanide salt in the presence of an organic complexing agent using efficient mixing to produce a catalyst slurry;

(b) combining the catalyst slurry with a polyether polyol that has tertiary hydroxyl groups;

(c) isolating a polyether-containing solid catalyst from the slurry;

(d) washing the polyether-containing solid catalyst with an aqueous solution that contains additional organic complexing agent; and (e) recovering a solid DMC catalyst that contains from about 5 to about 80 wt. % of the polyether polyol, 12. The method of claim 11 wherein the DMC catalyst is a zinc hexacyanocobaltate.

13. The method of claim 11 wherein the organic complexing agent is tert-butyl alcohol.

14. The method of claim 11 wherein the polyether polyol is an isobutylene oxide-capped poly(oxypropylene) polyol having a number average molecular weight within the range of about 200 to about 10,000.

* * * * *